United States Patent [19]
Turner

[11] 3,982,195
[45] Sept. 21, 1976

[54] METHOD AND APPARATUS FOR DECODING DIPHASE SIGNALS

[75] Inventor: Kenneth W. Turner, Des Plaines, Ill.

[73] Assignee: Teletype Corporation, Skokie, Ill.

[22] Filed: May 29, 1975

[21] Appl. No.: 581,989

[52] U.S. Cl. ............................ 329/50; 325/321; 329/104; 329/122
[51] Int. Cl.² ........................................ H03K 9/00
[58] Field of Search ............ 329/50, 102, 104, 106, 329/107, 122; 325/321; 178/68; 340/203, 206

[56] References Cited
UNITED STATES PATENTS

| | | | |
|---|---|---|---|
| 3,361,978 | 1/1968 | Fiorini | 329/104 X |
| 3,737,895 | 8/1971 | Cupp et al. | 340/347 DD |
| 3,878,334 | 4/1975 | Halpern | 329/122 X |
| 3,892,916 | 7/1975 | Boulter | 325/321 X |

Primary Examiner—Siegfried H. Grimm
Attorney, Agent, or Firm—W. K. Serp; J. L. Landis

[57] ABSTRACT

An incoming diphase signal is edge detected producing a train of pulses each pulse of which corresponds to a base-bit level transition or a mid-bit level transition. The mid-bit transition pulses are removed and the remaining base-bit transition pulses are used to control the frequency of a voltage controlled oscillator which clocks a shift register counter. Selected states of the counter are decoded to generate two regular pulse trains. Each pulse of the first pulse train occurs during the first half of a corresponding diphase base-bit time interval and the related pulse is used to selectively sample the diphase level. An exclusive NOR-gate compares this sampled level with the diphase level during the last half of the related diphase base bit time interval. The second train of pulses directs the sampling of the output of the exclusive NOR-gate at a selected moment during the last half of the same base-bit interval and the comparison information is stored for one base-bit interval thus generating a mark-space data signal corresponding to the data information carried by the incoming diphase signal.

13 Claims, 4 Drawing Figures

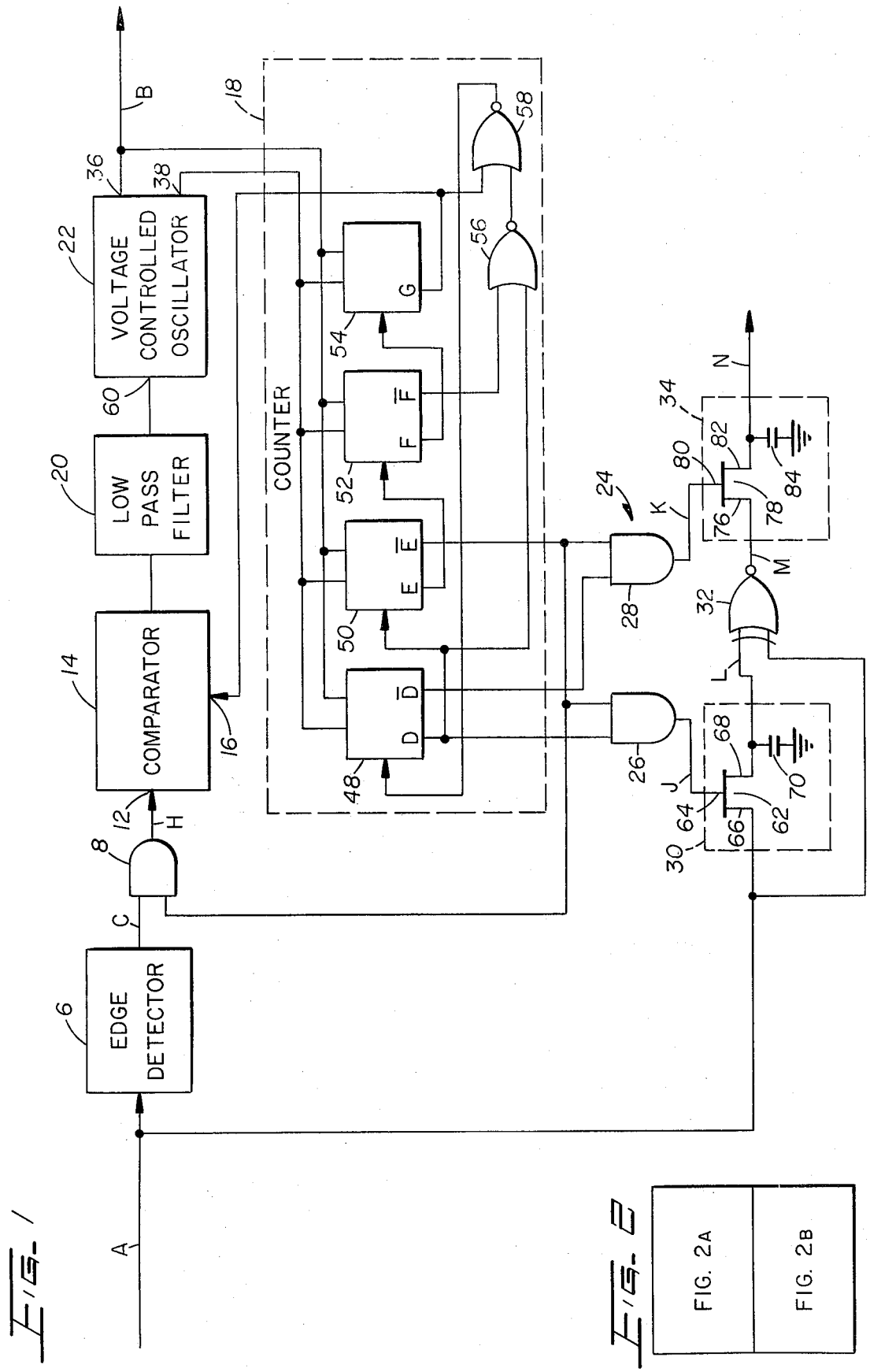

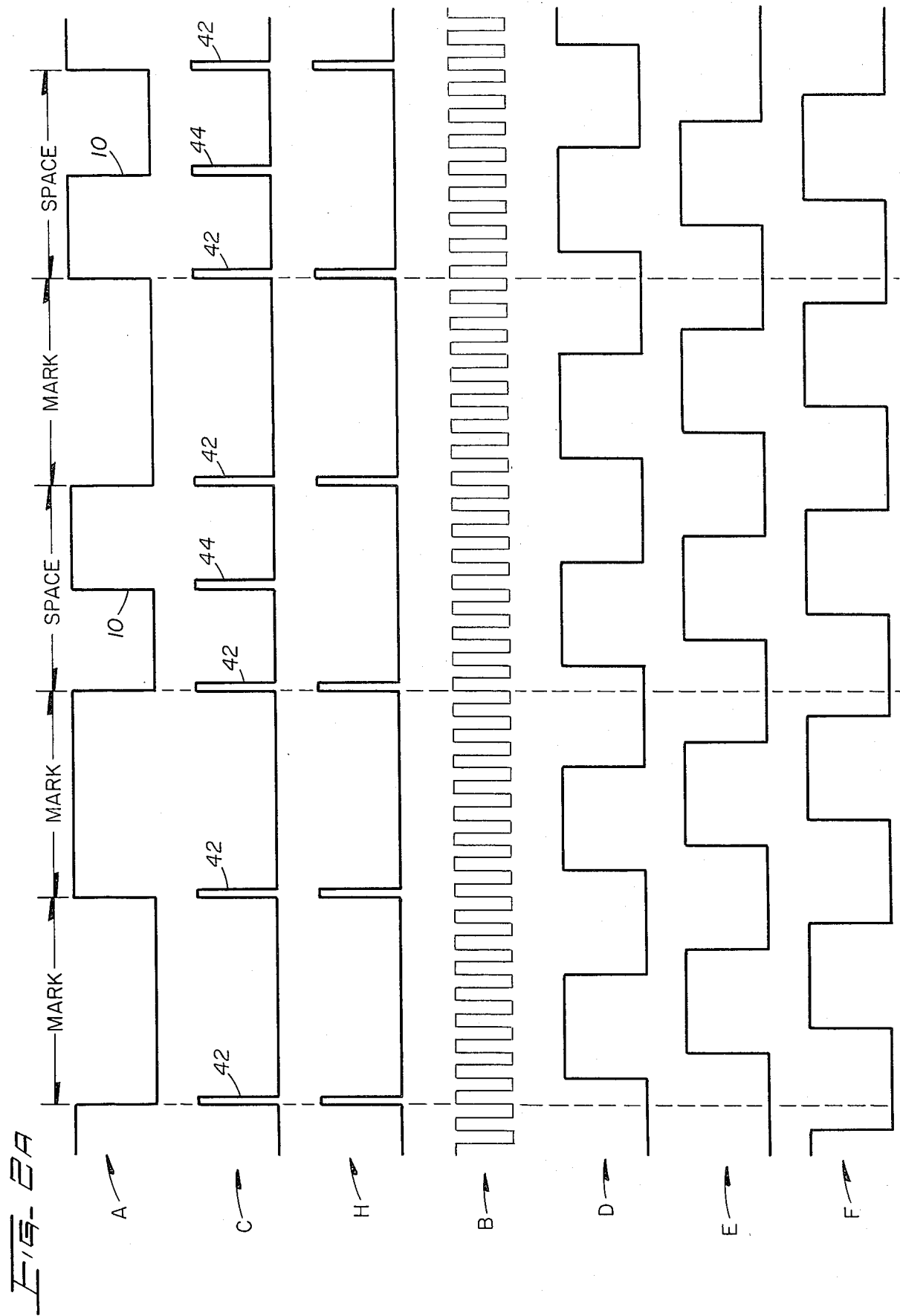

METHOD AND APPARATUS FOR DECODING DIPHASE SIGNALS

BACKGROUND OF THE INVENTION

This invention generally relates to an apparatus for decoding diphase signals and more particularly relates to an apparatus for generating clocking and data information from a diphase signal.

Various systems have been suggested for the serial transmission of data within and between the various units which comprise a communications terminal. One such system may be termed a mark-space serial signal and, still another, a diphase serial signal. The mark-space technique is efficient in that it utilizes one pair of transmission conductors; however it additionally requires some method of synchronizing the send and receive units. A diphase signal, on the other hand, transmits both data and synchronization information over a single pair of transmission conductors. The mark-space signal is a serial information stream wherein a mark is sent as a continuous on or high signal level and the space as a continuous off or low signal level. The signal remains at a constant level so long as a mark or space is present. That is, in response to a marking line a continuous high level is generated and, correspondingly, a spacing line is represented by a continuous low level. It will be appreciated that such a serial mark-space signal does not carry any clocking information. Present communication terminals generally operate from a common clock to maintain synchronization between all of the units within the system. A terminal utilizing such mark-space data signals for information transmission would usually require an additional pair of wires carrying the clocking information between the various units and thus increase the cost and complexity of the terminal interconnect system. The transmission of such serial mark-space data as well as the transmission of a clocking signal over commercial telephone lines is difficult and costly. An additional complication experienced with the mark-space type signal is its inherent inability to be coupled through isolation transformers. Such a drawback is especially important when private or commercial telephone circuits are used for the transmission of information. To overcome such restrictions, tone modulators and demodulators are often employed further increasing the system cost and complexity.

A diphase serial signal, as compared to a mark-space serial signal, provides a level transition at least once for each clock interval or data base-bit interval regardless of the data information being sent. For example, for each mark signal, the length of which is related to the clock period, a level transition will occur and thus a marking line of four mark signals will be indicated by four equally spaced signal level transitions. A space condition is indicated by an additional mid-bit transition occurring midway between the base bit transitions. For example, a space line of four space signals will be represented by eight level transitions (four base-bit transitions and four mid-bit transitions). Such diphase signals thus carry both data and clocking information. Therefore, since the signal carries both data and clock information in the form of level transitions, the separate transmission of additional clocking signals, for synchronization purposes, is unnecessary. A particular advantage with such diphase signals is that they may be transformer coupled, since all information is in the form of level transitions. Thus, the diphase signal may be transmitted over conventional telephone circuits without requiring tone modulators and demodulators.

SUMMARY OF THE INVENTION

The illustrated apparatus serves to decode a diphase signal which provides both data and clock information as signal level transitions. The apparatus includes means for generating a clock control signal, derived from the diphase signal, and related to the clock frequency which initially generated the diphase signal. Included is a controlled frequency oscillator, the frequency of which is determined by a clock control signal extracted from the diphase signal. Additionally, a counter having a plurality of distinct states is included which is clocked by the output of the oscillator. Means are provided responsive to selected states of the counter for decoding the data information carried by the diphase signal.

More particularly, the diphase clock information generating means includes an edge detector responsive to a change in the level of the diphase signal and provides an output signal in response thereto. The generating means is responsive to a selected state of the counter and serves to block selected edge detector output signals having predominately data information so that the signal controlling the oscillator is regular and directly related to the clock frequency which initially generated the diphase signal.

The decoding means includes a first sampling circuit for sampling the level of the diphase signal during a first preselected count of the counter and means for comparing the sampled diphase signal level with a subsequent level of the diphase signal. Further, the decoding means includes a second sampling circuit for sampling the output level of the comparing means during a second preselected count of the counter.

A method is described for decoding a diphase signal including the steps of locking an oscillator to the clock frequency of the diphase signal and sampling the level of the diphase signal during the first half of a base-bit time interval as determined by the oscillator. Also, the method includes the step comparing the sampled level with the level of the diphase signal during the last half of the same base-bit time interval and storing this sampled level.

It is a main object of this invention to provide an apparatus for decoding a diphase signal and providing clock as well as data information therefrom. Other objects and advantages of the invention will be more readily appreciated after reference to the following description and accompanying drawings wherein:

DESCRIPTION OF THE DRAWINGS

FIG. 1 is a schematic diagram of a diphase decoder including certain features of this invention.

DESCRIPTION OF THE ILLUSTRATED EMBODIMENT

General

Figure 2B:
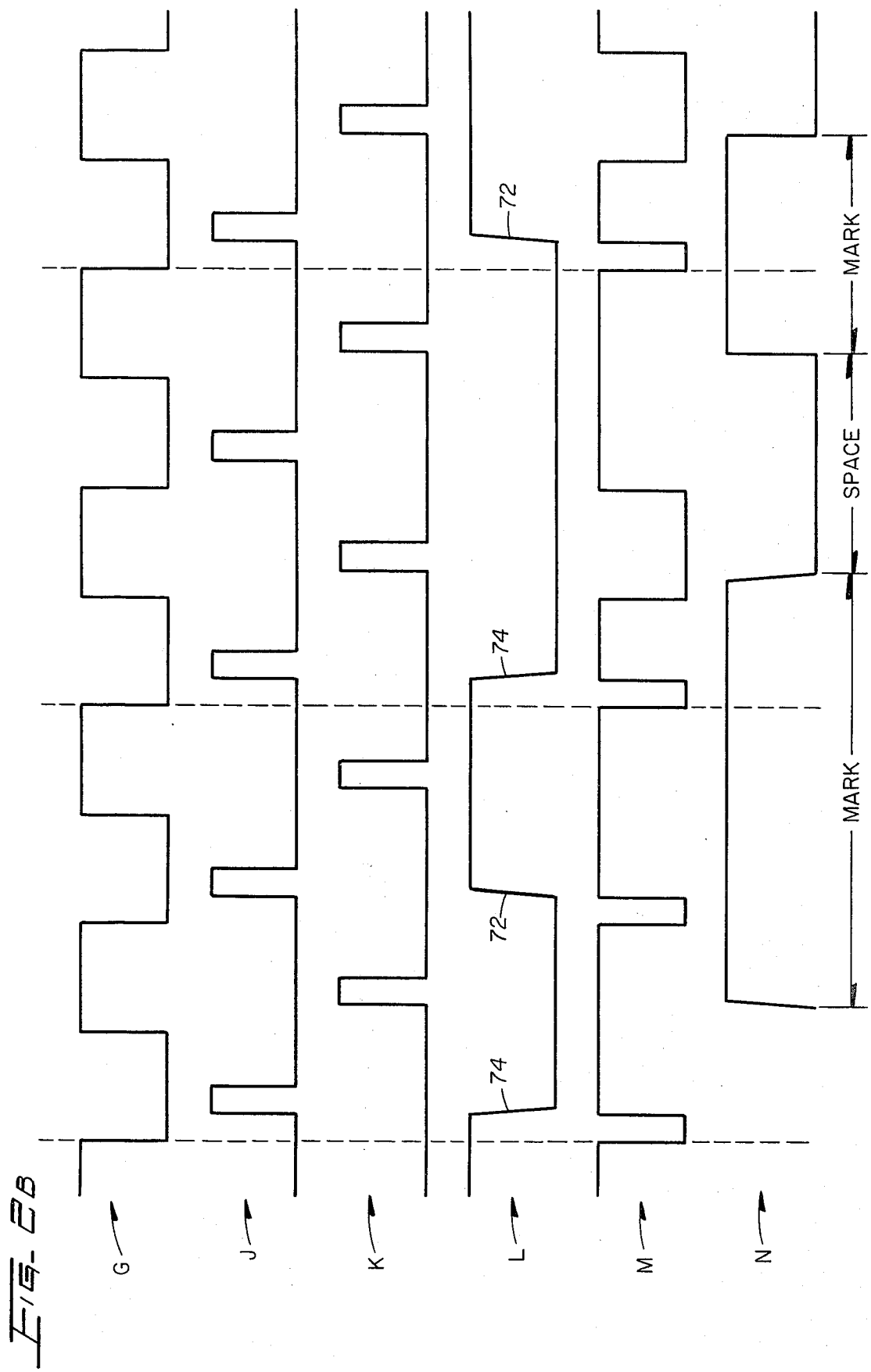
FIG. 2, which is comprised of FIGS. 2A and 2B, is a timing diagram illustrating the operational relationship between certain of the components illustrated in FIG. 1.

Incoming diphase data A is processed by an edge detector 6 and AND-gate 8 which removes the mid-bit space transitions 10 (FIG. 2A) of the incoming diphase signal A. This base bit timing information is fed to one input 12 of a phase comparator 14 the alternate input 16 of which is provided by the output of a counter 18. The output of the phase comparator 14 provides a constant amplitude pulse, the width of which is proportional to the phase difference between the two input signals. The output of the phase comparator 14 is fed through a low pass filter 20 which serves to average the incoming pulses and provides a varying direct current voltage proportional to the phase difference between the two input signals to the comparator 14. The output of the low pass filter 20 is fed to the input of a voltage control oscillator 20. In this manner, the frequency of the voltage control oscillator 22 is determined by the control voltage from the low pass filter 20 and, in this manner, is locked to the clocking information derived from the incoming diphase signal A. Additionally, various levels from the counter 18 are fed to a decoder 24 including a pair of AND-gates 26 and 28. A first AND-gate 26 provides a signal during the first half of the incoming diphase base-bit interval and feeds one input of a first sample and hold circuit 30 which samples the data level during the first half of the selected base-bit interval. This sampled information is compared with the incoming diphase data signal A, by an exclusive NOR-gate 32. The output of the exclusive NOR-gate 32 is fed to a second sample and hold circuit 34, the remaining input of which is fed by a signal from the output of the second AND-gate 28 of the decoder 24 which occurs during the last half of the same base-bit interval. Thus, if the level of the selected base-bit is constant during the entire base-bit interval, the sampled signal will be high and if the level changes during the selected base-bit interval, indicating the presence of a mid-bit level transition 10, the sampled information during the last half of the base-bit interval will be low indicating a space signal. In this manner, data information is extracted from the incoming diphase data signal producing a mark-space data signal. The VCO oscillator provides outputs 36 and 38 which are synchronized with the clock information of the diphase signal and are available for subsequent use by the communications terminal.

Detailed

With reference to FIGS. 1 and 2, the latter providing a relative timing diagram of various frequencies generated throughout the illustrated apparatus, the incoming diphase signal A is fed to the input of the edge detector 6. As illustrated, the diphase signal A provides a level transition at the completion of each base bit irrespective of the number of continuous space or mark signals. As mentioned, there is at least one informational transition for a mark signal and an additional mid-bit transition 10 indicating a space signal. The output of the edge detector 6 is a pulse train C with a positive going pulse generated upon the occurrence of each level transition with pulses 42 indicating base-bit transitions and pulses 44 indicating mid-bit transitions. With reference to FIG. 2, it will be noted that the mid-bit transition pulse 44 indicating a space signal contains mainly data rather than timing information. The pulses from the edge detector 6 are fed to one input of an AND-gate 46 the remaining input of the AND-gate 46 is fed by the output of the four stage shift register counter 18 as will be further considered.

The shift register counter includes four stages 48, 50, 52, and 54, the logic functions of which are similar to those of a type D flip-flop. The counter 18 provides four output levels designated D, E, F, and G, which are illustrated in FIGS. 2A and 2B. This particular counter configuration is particularly desirable in that it may be conveniently implemented by metal-oxide-silicon (MOS) fabrication methods. A particular characteristic of the illustrated counter 18 provides eight distinct states for each complete counter cycle as indicated by the following truth table.

| Outputs | | | | Count |
|---|---|---|---|---|
| D | E | F | G | |
| 0 | 0 | 0 | 0 | 0 |
| 1 | 0 | 0 | 0 | 1 |
| 1 | 1 | 0 | 0 | 2 |
| 1 | 1 | 1 | 0 | 3 |
| 1 | 1 | 1 | 1 | 4 |
| 0 | 1 | 1 | 1 | 5 |
| 0 | 0 | 1 | 1 | 6 |
| 0 | 0 | 0 | 1 | 7 |

The four stages of the counter 18 are clocked by the two complementary output phases 36 and 38 of the voltage controlled oscillator 22. Serving to prevent a non-allowed counter state, the input of a NOR-gate 56 is connected to the output D of the first counter stage 48 with the remaining input connected to the complement output F̄ of the third counter stage 52. The output of the NOR-gate 56 is fed to one input of a second NOR-gate 58 with the remaining input of this gate coupled to the direct output G of the last shift register stage 57 and the output of the second NOR-gate 58 is fed to the input of the first shift register stage 48. The counter illustrated is similar in operation to a four phase twisted ring counter well known to those skilled in the art and described in available publications.

Serving to remove the pulses 44 generated by the diphase mid-bit transitions from the output of the edge detector 6, the complement output from the second shift register cell 50 is fed to the remaining input of the AND-gate 8. As illustrated in FIG. 2, the complement output Ē of the second counter stage 50 is low for each occurrence of the mid-bit space transition pulse 44 thus holding the output of the AND-gate 8 low during the center portion of the base bit time interval regardless of the level of the alternate input signal. It will be appreciated that the Ē output of the shift register counter 50 is low whenever the mid-bit transitional pulse 44 is generated by the edge detector 6 and is high during those periods when the regular base bit transitions pulses 42 occur. In this manner, the output H of the AND-gate 8 is held low during the period when the mid-bit transition pulse occurs and thus the comparator is fed only with the pulses 42 derived from the base-bit transitions. The signal level H is fed to the input 12 of the phase comparator 14, the remaining input 16 is fed by the direct output G of the last stage 54 of the shift register counter 18.

The signals H and G are compared and a frequency increasing control voltage is provided at the output of the low pass filter 20 which is fed therefrom into a control input 60 of the voltage control oscillator 22. The voltage controlled oscillator 22 is normally biased to lower the oscillator frequency in the absence of the control voltage. The output of the low pass filter 20 counters this bias raising the oscillator frequency to correspond with the clock frequency of the diphase signal. Since the output pulse G is forced to correspond with the occurrence of the pulses H, the VCO frequency is eight times the base bit frequency of the diphase signal and the start of a counter 18 cycle corresponds to the occurrence of a detected diphase base-bit transition as shown at H (FIG. 2A). The nominal frequency of the oscillator 22 is selected to correspond with the clock frequency used to initially generate the diphase signal. It will be appreciated that other frequency relationships may be used without departing from the scope and spirit of the invention. To summarize, the output frequency of the oscillator 22 is synchronized with the original frequency of the diphase signal generating clock (not shown) and the counter cycle is synchronized to the base bit transitions of the diphase signal. Both the direct and complement outputs of the voltage control oscillator 22 are fed to each of the stages 48, 50, 52, and 54 comprising the shift register counter 18. Selected output stages from the counter 18 are fed to the decoder 24 which includes the AND-gates 26 and 28.

The inputs of the first AND-gate decoder 26 are fed by the direct output D of the first shift register cell 48 and the complement output $\bar{E}$ of the second shift register cell 50. The output of the first AND-gate 26 designated J is illustrated in FIG. 2 and provides a series of regular positive going pulses each of which occurs during the first half of each base-bit interval of the diphase signal A. Similarly, the inputs to the second AND-gate 28 of the decoder 24 are fed by the complement output $\bar{D}$ of the first cell 48 of the shift register counter 18 and the complement output $\bar{E}$ of the third cell 52 of the shift register counter 18. The second decoder AND-gate 28 provides a pulse train K (FIG. 2B) which is similar to that of the first AND-gate 26 output J. However, the timing of the second pulse train K is staggered with respect to the first and the pulses occur during the last half of the diphase base-bit interval.

As previously mentioned, the level of the diphase signal remains constant throughout the base bit interval for a mark and changes level providing a mid-bit transition for a space signal. The sample and compare circuit 30 includes a metal-oxide-silicon field-effect (MOSFET) transistor 62 in a switching configuration with the gate 64 connected to the output of the first AND-gate 26 and with one of the controlled terminals 66 connected to the incoming diphase signal A. The remaining controlled terminal 68 of the MOSFET 62 is tied to one end of a storage capacitor 70. The remaining terminal of the capacitor 70 is grounded. When the output of the AND-gate 26 goes high, during the first half of a diphase base-bit interval, the signal level of the diphase signal A is coupled through the MOSFET 64 to the storage capacitor 70 which stores the sampled level. This stored output signal level is designated L and illustrated in FIG. 2B. The leading 72 and trailing 74 edges of the stored level L being slightly damped, due to the charging characteristics of the capacitor 70. The output of the first sample and hold circuit 30 is fed to one input of the exclusive NOR-gate 32 the alternate input of which is fed by the incoming diphase signal A. The logic function of the exclusive NOR-gate is such that it will provide a low output when either of the two input signals are high, and a low level when both inputs are the same as illustrated by the following truthtable.

| Input 1 | Exclusive NOR-gate Input 2 | Output |
| --- | --- | --- |
| 0 | 0 | 1 |
| 1 | 0 | 0 |
| 0 | 1 | 0 |
| 1 | 1 | 1 |

Thus, the exclusive NOR-gate 32 provides a low level signal when the diphase signal has a transition during the base-bit interval corresponding to a space signal and will remain high when the diphase signal A remains constant throughout a base-bit interval corresponding to a mark signal. The output M of the exclusive NOR-gate, illustrated in FIG. 2B, is fed to a controlled terminal 76 of a second switching MOSFET transistor 78. A gate 80 of the MOSFET is fed by the output K of the second decoder AND-gate 28. A remaining controlled terminal 82 of the MOSFET 78 is connected to a storage capacitor 84 across which the decoded diphase mark-space data is developed as will subsequently be more fully described. The output of the exclusive NOR-gate 32 is fed to one of the control terminals 76 and sampled by the sample and hold circuit 34, when the output K of the second decoder AND-gate 28 is high. This condition occurs during the last half of the diphase base-bit interval and is retained in that state until the next sampling. Thus the charge N upon the capacitor 84 follows the signal level of the output of the exclusive NOR-gate 32 during the sampling period when the output from the AND-gate 28 is high and remains at this level for a full base-bit interval. As previously mentioned, the output of the exclusive NOR-gate will be low during the last half of the base bit interval in response to a space signal due to the level transition at the mid-bit location and high during a mark signal as a result of the constant level during the corresponding base bit interval. With refrence to the signal level N illustrated in FIG. 2B it will be noted that, although delayed by three quarters of a base bit time interval, the signal level N corresponds to the mark-space data carried by the incoming diphase signal A with a mark being an ON state and a space being an OFF state.

SUMMARY

The illustrated embodiment serves to decode the incoming diphase signal A and generates a clock B as well as the mark-space data signal N. The diphase signal A is edge detected and the mid-bit space signal transitions 44 are suppressed providing a train of regular pulses H related to the clock frequency of the original clock which initially generated the diphase signal A. The pulses H are fed to one input of the phase comparator 14 the alternate input of which is fed by a signal related to the output signal from the voltage control oscillator 22. The output of the comparator 14 is used to synchronize the oscillator 22 with the decoded diphase clocking signal H.

The output of the shift register counter 18 is decoded by means of AND-gates 26 and 28. The output of the first gate 36 controls a sample and compare circuit 30 which samples the incoming data A during the first half of each diphase base-bit interval and feeds this level to an exclusive NOR-gate 32 for comparison with the incoming diphase signal A during the last half of the same base-bit interval. The comparison signal M is fed to a second sample and hold circuit 34which samples the compared information during the last half of the base-bit interval and thus provides a mark-space signal corresponding to the original clock frequency which generated the diphase signal and the second is a data signal N corresponding to the mark-space data carried by the diphase signal A.

Although the invention has been particularly shown and described with reference to a preferred embodiment thereof, it will be understood that various changes in form and detail may be made without departing from the scope and spirit of the invention.

What is claimed is:

1. An apparatus for decoding a diphase signal, the apparatus providing diphase data and clock information comprising:
   means for generating a clock control signal derived from the diphase signal and related to the clock which initially generated the diphase signal;
   a controlled frequency oscillator the frequency of which is determined by said clock control signal derived from the clock information of the diphase signal;
   a counter advanced by the output of said controlled frequency oscillator said counter having a plurality of distinct states;
   means, responsive to selected states of said counter, for decoding data information from said diphase signal; and
   said clock control signal generating means includes an edge detector responsive to a change in the level of said diphase signal and providing an output signal in response thereto, said clock control signal generating means including means responsive to a selected state of said counter for suppressing selected edge detector output signals having predominately data information so that said signal controlling said oscillator is regular and directly related to the clock frequency which initially generated the diphase signal.

2. The apparatus in claim 1 wherein said decoding means includes a first sampling circuit for sampling the level of the diphase signal during a first preselected state of said counter and means for comparing this sampled diphase signal level with a subsequent diphase signal level.

3. The apparatus of claim 2 wherein said decoding means additionally includes a second sampling circuit for sampling the output level of said comparing means during a second preselected state of said counter so as to provide a mark-space signal corresponding to the data information carried by the diphase signal.

4. The apparatus of claim 2 wherein said first sampling means samples the level of the diphase signal during the first half of a selected diphase base-bit interval as determined by said counter.

5. The apparatus of claim 4 wherein said decoding means further includes a second sampling means for sampling the output level of said comparing means during the last half of the said selected base-bit interval as determined by said counter.

6. The apparatus of claim 5 wherein said comparing means includes an exclusive gating function for comparing the output of said first sampling means with the diphase signal during the second sampling interval of said second sampling means whereby said second sampling means provides a mark-space signal corresponding to the data information carried by the diphase signal.

7. An apparatus for decoding a diphase signal, the apparatus providing diphase data and clock information comprising:
   means for generating a clock control signal derived from the diphase signal and related to the clock which initially generated the diphase signal;
   a controlled frequency oscillator the frequency of which is determined by said clock control signal derived from the clock information of the diphase signal;
   a counter advanced by the output of said controlled frequency oscillator said counter having a plurality of distinct states;
   means, responsive to selected states of said counter, for decoding data information from said diphase signal; and
   said decoding means includes a first sampling means for sampling the level of the diphase signal during a first preselected state of said counter and means for comparing the sampled diphase signal level with a subsequent diphase signal level.

8. The apparatus of claim 7 wherein said decoding means further includes a second sampling means for sampling the output level of said comparing means during a second preselected state of said counter.

9. The apparatus of claim 8 wherein said first sampling means samples the level of the diphase signal during the first half of a preselected diphase base-bit interval as determined by said counter, said comparing means including an exclusive gating function for comparing the output of said first sampling means with the diphase signal during the sampling interval of said second sampling means whereby said second sampling means provides a mark-space signal corresponding to the data carried by the diphase signal.

10. The apparatus of claim 7 which further includes a second sampling means for sampling the output level of said comparing means during the last half of said selected base-bit interval as determined by said counter.

11. The apparatus of claim 10 wherein said clock control signal generating means includes an edge detector responsive to a level change of said diphase signal and provides an output signal in response thereto, said clock control signal generating means including means responsive to a selected count of said counter for suppressing selected edge detector output signals having predominately data information so that said signal controlling said oscillator is regular and directly related to the clock frequency which initially generated the diphase signal.

12. A method for decoding a diphase signal comprising the steps of:
   locking an oscillator to the clock frequency of the diphase signal;
   sampling the level of the diphase signal during the first half of each diphase base-bit interval;
   comparing the sampled base-bit level with the level of the diphase signal during the last half of the same diphase base-bit interval; and storing the comparison level.

13. The method of claim 12 which further comprises the steps of:
   generating an oscillator control signal in response to diphase signal level transitions for control of the oscillator and suppressing those diphase signal transitions generated by mid-bit diphase level transitions so that the oscillator is controlled predominately by the diphase base bit level transitions.

* * * * *